United States Patent
Long (10) Patent No.: US 9,100,327 B2
(45) Date of Patent: Aug. 4, 2015

(54) BANDWIDTH INFORMATION NOTIFICATION METHOD, SERVICE PROCESSING METHOD, NETWORK NODE AND COMMUNICATION SYSTEM

(75) Inventor: Hao Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 375 days.

(21) Appl. No.: 13/371,795

(22) Filed: Feb. 13, 2012

(65) Prior Publication Data

US 2012/0140625 A1 Jun. 7, 2012

Related U.S. Application Data

(63) Continuation of application No. PCT/CN2010/076043, filed on Aug. 17, 2010.

(30) Foreign Application Priority Data

Aug. 21, 2009 (CN) .......................... 2009 1 0167223

(51) Int. Cl.
*G01R 31/08* (2006.01)
*H04L 12/813* (2013.01)
*H04L 1/00* (2006.01)
*H04L 12/851* (2013.01)

(52) U.S. Cl.
CPC .............. *H04L 47/20* (2013.01); *H04L 1/0003* (2013.01); *H04L 47/2408* (2013.01)

(58) Field of Classification Search
CPC ..... H04L 1/0003; H04L 47/20; H04L 1/0009; H04L 1/0031; H04L 1/0675; H04L 25/02; H04L 47/12; H04L 47/2408; H04L 47/26; H04L 69/03; H04L 43/0841; H04L 45/22; H04W 80/00; H04W 92/00

See application file for complete search history.

(56) References Cited

U.S. PATENT DOCUMENTS

| | | | |
|---|---|---|---|
| 6,393,064 B1 | 5/2002 | Nagai et al. | |
| 6,912,215 B1* | 6/2005 | Lin et al. ....................... | 370/347 |
| 2007/0036073 A1* | 2/2007 | Yamada et al. ............... | 370/225 |
| 2007/0064604 A1 | 3/2007 | Chen et al. | |

(Continued)

FOREIGN PATENT DOCUMENTS

| | | |
|---|---|---|
| CN | 1852325 A | 10/2006 |
| CN | 101465714 A | 6/2009 |

(Continued)

OTHER PUBLICATIONS

Russian Office Action received in Application No. 2012110583 mailed Jun. 25, 2013, 12 pages.

(Continued)

*Primary Examiner* — David Oveissi
(74) *Attorney, Agent, or Firm* — Slater & Matsil, L.L.P.

(57) ABSTRACT

A bandwidth information notification method includes: obtaining current bandwidth information of a link; and sending the bandwidth information to an endpoint of a service connection through the service connection which passes through the link. The endpoint of the service connection can adjust a service policy according to the bandwidth information. An endpoint of a service connection which passes through a microwave link may obtain bandwidth information of the microwave link, where the bandwidth information is obtained after adaptive modulation of the microwave link.

12 Claims, 4 Drawing Sheets

(56) References Cited

U.S. PATENT DOCUMENTS

| | | | |
|---|---|---|---|
| 2007/0064605 A1* | 3/2007 | Ho et al. .................. | 370/230 |
| 2008/0186865 A1 | 8/2008 | Yong et al. | |
| 2008/0298299 A1* | 12/2008 | Thesling .................. | 370/316 |
| 2009/0245408 A1* | 10/2009 | Mujtaba et al. ........... | 375/267 |
| 2010/0142550 A1 | 6/2010 | Zhang | |
| 2010/0281518 A1* | 11/2010 | Bugenhagen ............. | 726/3 |

FOREIGN PATENT DOCUMENTS

| | | |
|---|---|---|
| CN | 101582839 A | 11/2009 |
| CN | 101631363 A | 1/2010 |
| EP | 1 276 265 A2 | 1/2003 |
| EP | 2 451 207 A1 | 5/2012 |
| JP | 2001-358729 | 12/2001 |
| JP | 2004-179893 | 6/2004 |
| JP | 2006-067433 | 3/2006 |
| JP | 2006-287549 | 10/2006 |
| WO | WO 2008/095386 A1 | 8/2008 |

OTHER PUBLICATIONS

Communication pursuant to Article 94(3) EPC received in Application No. 10 809 555.5-1862, Applicant: Huawei Technologies Co. Ltd. mailed Jun. 20, 2013, 9 pages.

Australian Office Action received in Application No. 2010285377 mailed Jun. 20, 2013, 3 pages.

Notice of Reasons for Rejection received in Japanese Application No. 2012-525040 mailed Jun. 18, 2013, 4 pages.

English-language International Search Report from the Chinese Patent Office in International Application No. PCT/CN2010/076043 dated Nov. 25, 2010.

First Chinese Office Action of (priority) Chinese Application No. 200910167223.6 mailed Jul. 26, 2011.

Supplementary Extended European Search Report in corresponding European Application No. EP 1080955.5-2416/2451207 of PCT/CN2010/076043 dated May 4, 2012.

English-language Written Opinion of the International Searching Authority from the State IP Office for International Application No. PCT/CN2010/076043 dated Nov. 25, 2010.

Luong, et al., "QoS Protection in Cognitive Wireless Mesh Networks: Issues and Solutions", 2009 Seventh Annual Communication Networks and Services Research Conference, pp. 278-285, (2009).

IEEE Standards, "IEEE Standard for Information technology—Telecommunications and Information exchange between systems—Local and metropolitan area networks—Specific requirements, Part 3: Carrier Sense Multiple Access with Collision Detection (CSMA/CD) Access Method and Physical Layer Specifications Amendment: Media Access Control Parameters, Physical Layers, and Management Parameters for Subscriber Access Networks", IEEE Std. 802.3ah, pp. i-xi and 1-623, (Sep. 7, 2004).

* cited by examiner

FIG. 7

BANDWIDTH INFORMATION NOTIFICATION METHOD, SERVICE PROCESSING METHOD, NETWORK NODE AND COMMUNICATION SYSTEM

CROSS-REFERENCE TO RELATED APPLICATIONS

This application is a continuation of International Application No. PCT/CN2010/076043, filed on Aug. 17, 2010, which claims priority to Chinese Patent Application No. 200910167223.6, filed on Aug. 21, 2009, both of which are hereby incorporated by reference in their entireties.

FIELD OF THE INVENTION

The present invention relates to the field of communication technologies, and in particular, to a bandwidth information notification method, a service processing method, a network node, and a communication system.

BACKGROUND OF THE INVENTION

Internet Protocol (IP: Internet Protocol) services increase rapidly, and become a mainstream service type by replacing time division multiplexing (TDM: Time Division Multiplexing) services gradually. And network traffic also increases rapidly. Traditional Synchronous Digital Hierarchy (SDH: Synchronous Digital Hierarchy)/Multi-Service Transport Platform (MSTP: Multi-Service Transport Platform) equipment cannot make full use of a statistic multiplexing feature of a packet service, and cannot meet an increasingly stringent bandwidth requirement in another aspect. Therefore, SDH equipment is being replaced by packet transport network (PTN: Packet Transport Network) equipment.

Meanwhile, microwave equipment is widely applied in the operator' network. Currently, SDH microwave equipment and Plesiochronous Digital Hierarchy (PDH: Plesiochronous Digital Hierarchy) microwave equipment are commonly deployed. As PTN equipment replaces SDH equipment, packet microwave equipment begins to replace SDH/PDH microwave equipment accordingly, and is widely applied in recent years. The packet microwave equipment refers to that packet equipment having one or more microwave interfaces.

A microwave link differs from a fiber link in that the microwave link can perform adaptive modulation (AM: Adaptive Modulation) as the weather changes, which leads to a bandwidth change of the microwave link. Moreover, a bandwidth change is determinate. A transport network generally requires quite high capability of operation, administration and maintenance (OAM: Operation, Administration and Maintenance). However, PTN OAM functions at present are only some general operations.

The PTN OAM functions at present are only some general operations, and therefore, the microwave link after performing adaptive modulation cannot be notified to an endpoint of a service connection which passes through the microwave link, which causes service congestion since the endpoint of the service connection still performs traffic control according to the bandwidth information before applying adaptive modulation.

SUMMARY OF THE INVENTION

Embodiments of the present invention provide a bandwidth information notification method, a service processing method, a network node, and a communication system, so that a service connection endpoint which passes through a link may obtain current bandwidth information of the link.

An embodiment of the present invention provides a bandwidth information notification method, including:
obtaining current bandwidth information of a link;
sending the bandwidth information to an endpoint of a service connection which passes through the link, so that the endpoint of the service connection adjusts a service policy according to the bandwidth information.

An embodiment of the present invention further provides a service processing method, including:
receiving current bandwidth information of a link, where the bandwidth information is sent by a network node that is attached by the link;
according to a preset corresponding relationship between bandwidth information and a service policy, determining a service policy corresponding to the bandwidth information; and
performing service processing according to the service policy corresponding to the bandwidth information.

An embodiment of the present invention further provides a network node, including:
an obtaining unit, configured to obtain current bandwidth information of a link; and
a sending unit, configured to send the bandwidth information obtained by the obtaining unit to an endpoint of a service connection which passes through the link, so that endpoint of the service connection adjusts a service policy according to the bandwidth information.

An embodiment of the present invention further provides a network node, including:
a receiving unit, configured to receive current bandwidth information of a link, where the bandwidth information is sent by a network node that is attached by the link;
a determining unit, configured to, according to a preset corresponding relationship between bandwidth information and a service policy, determine a service policy corresponding to the bandwidth information that is received by the receiving unit; and
a processing unit, configured to perform service processing according to the service policy determined by the determining unit.

An embodiment of the present invention further provides a communication system that includes a network node provided in an embodiment of the present invention.

It can be seen from the preceding technical solutions provided in the embodiments of the present invention that, in the embodiments of the present invention, bandwidth information of a microwave link in a current modulation mode can be obtained, and the bandwidth information is sent to an endpoint of a service connection which passes through the microwave link. Therefore, the endpoint of the service connection may adjust a service policy according to the bandwidth information, so that a bandwidth of the microwave link can meet a service requirement, and thus avoid service congestion.

BRIEF DESCRIPTION OF THE DRAWINGS

To describe the technical solutions in the embodiments of the present invention more clearly, the accompanying drawings required for describing the embodiments are introduced briefly in the following. Apparently, the accompanying drawings in the following description are only some embodiments, and persons of ordinary skill in the art may also derive other drawings from these accompanying drawings without making any creative effort.

DETAILED DESCRIPTION OF THE EMBODIMENTS

The technical solutions in the embodiments of the present invention are described clearly and fully in the following with reference to the accompanying drawings in the embodiments of the present invention. Apparently, the embodiments to be described are merely a part rather than all of the embodiments of the present invention. All other embodiments obtained by those skilled in the art without any creative effort shall fall within the protection scope of the present invention.

Figure 1:
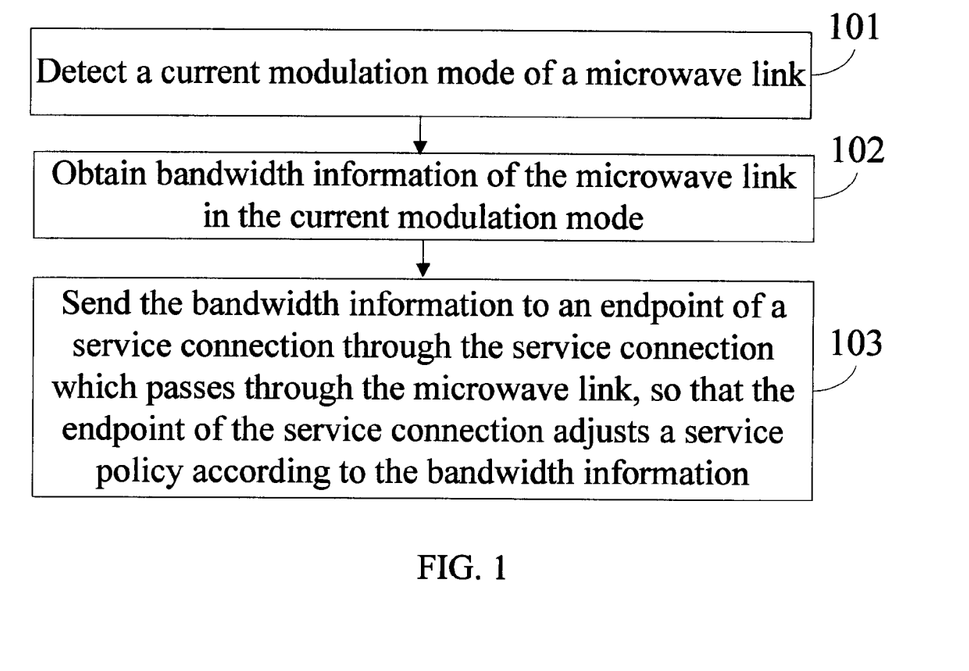
FIG. 1 is a flowchart of a bandwidth information notification method according to a first embodiment of the present invention.

A bandwidth information notification method provided in an embodiment of the present invention is described first. FIG. 1 illustrates a procedure of a bandwidth information notification method according to a first embodiment. In this embodiment, a processing procedure of a network node that is attached by a microwave link is described, which includes:

101: Detect a current modulation mode of the microwave link.

The detection may be through real-time monitoring or periodical detection.

102: Obtain bandwidth information of the microwave link in the current modulation mode.

A bandwidth of the microwave link is different in different modulation modes, and the bandwidth of the microwave link in each modulation mode is determinate. Therefore, corresponding bandwidth information may be obtained once the current modulation mode of the microwave link is determined. The obtained bandwidth information may be bandwidth level indication information or modulation mode information.

For example, an optimal modulation mode of the microwave link is 64 Quadrature Amplitude Modulation (QAM: Quadrature Amplitude Modulation), and a bandwidth in this modulation mode is 1 Gbps; when a modulation mode is 16QAM, a bandwidth is 0.6 Gbps; therefore, when a modulation mode is 64QAM, bandwidth level indication information may be 1 Gbps; when the modulation mode is 16QAM, the bandwidth level indication information may be 0.6 Gbps; when the modulation mode is 64QAM, modulation mode information may be a 64QAM modulation mode; and when the modulation mode is 16QAM, the modulation mode information may be a 16QAM modulation mode. In an embodiment of the present invention, the bandwidth indication information may also not be a specific bandwidth value, but a number that represents the bandwidth value. For example, 7 represents 1 Gbps, and 5 represents 0.6 Gbps. Therefore, in the case of the 64QAM modulation mode, the bandwidth level indication information may be 7; and in the case of the 16QAM modulation mode, the bandwidth level indication information may be 5. Specifically, which number represents which bandwidth value may be configured as required.

103: Send the bandwidth information to an endpoint of a service connection through the service connection which passes through the microwave link, so that the endpoint of the service connection adjusts a service policy according to the bandwidth information.

The microwave link is one of the multiple links that are passed through by the service connection. That is, at least one link between two network nodes of the service connection is a microwave link. The service connection may be an Ethernet connection, such as a Virtual Local Area Network (VLAN: Virtual Local Area Network) connection, and a Provider Backbone Bridge—Traffic Engineering Ethernet Switch Path (PBB-TE ESP: Provider Backbone Bridge Traffic Engineering Ethernet Switch Path) connection; and the service connection may also be a non-Ethernet connection, such as a Multi Protocol Label Switch Label Switched Path (MPLS LSP: Multi Protocol Label Switch Label Switched Path) connection, and may also be a Label Switched Path (LSP: Label Switched Path) connection.

The bandwidth information is sent by a network node that is attached by the microwave link through a bandwidth notification message. The bandwidth notification message may be an Alarm Indication Signal/Suppression (AIS: Alarm Indication Signal/Suppression) message or a new Operation, Administration, and Maintenance (OAM: Operation, Administration, and Maintenance) message.

In an embodiment of the present invention, bandwidth information may be sent to an endpoint of a service connection which passes through a microwave link through an AIS message. An existing MS message may be extended, so that the AIS message can carry the bandwidth information.

In another embodiment of the present invention, bandwidth information may also be sent through a new OAM message. The new OAM message may be a newly defined OAM message, and may also be a message obtained by extending another OAM message.

It can be known from the preceding that, in this embodiment, the network node that is attached by the microwave link may obtain the bandwidth information of the microwave link in the current modulation mode, and sends the bandwidth information to the endpoint of the service connection which passes through the microwave link. Therefore, the endpoint of the service connection may adjust the service policy according to the bandwidth information, so that a bandwidth of the microwave link can meet a service requirement, and service congestion can be avoided.

Figure 2:
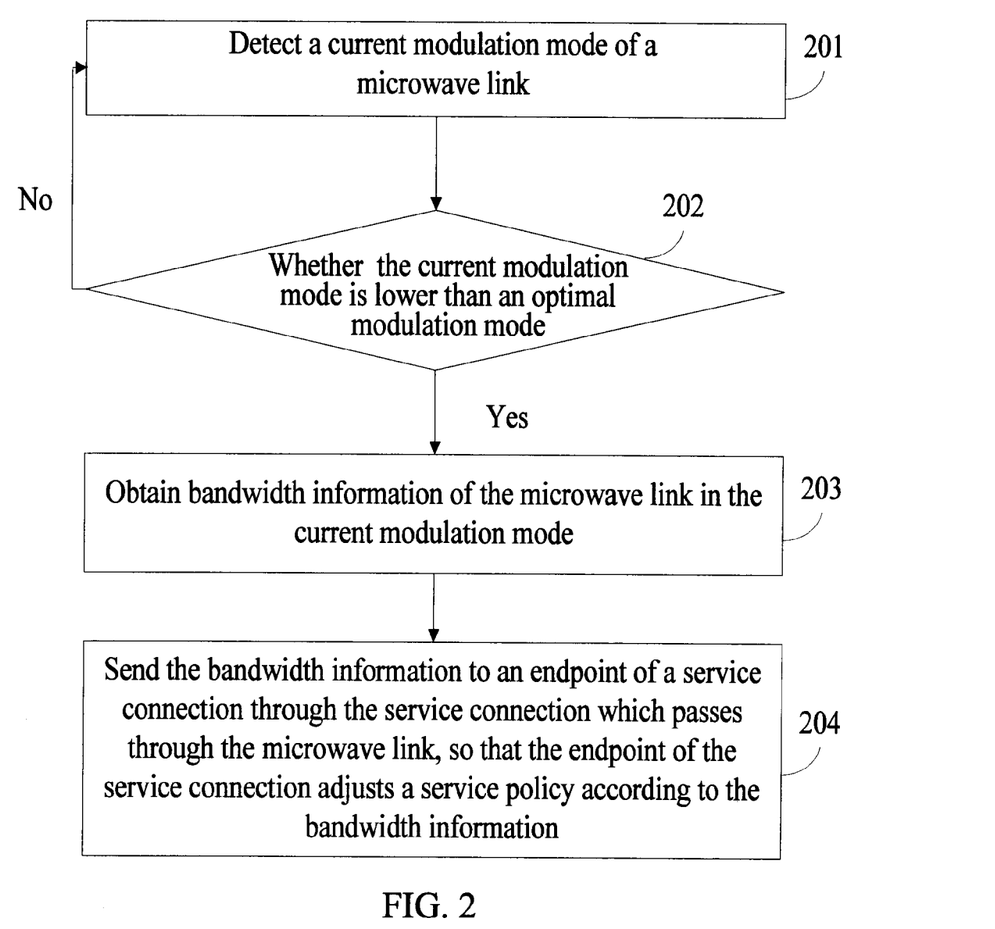
FIG. 2 is a flowchart of a bandwidth information notification method according to a second embodiment of the present invention.

FIG. 2 illustrates a procedure of a bandwidth information notification method according to a second embodiment. In this embodiment, a processing procedure of a network node that is attached by a microwave link is described, which includes:

201: Detect a current modulation mode of the microwave link.

The detection may be real-time monitoring or periodical detection.

202: Judge whether the current modulation mode is lower than an optimal modulation mode; if the current modulation mode is lower than the optimal modulation mode, proceed to step 203; and if the current modulation mode is not lower than the optimal modulation mode, proceed to step 201.

203: Obtain bandwidth information of the microwave link in the current modulation mode.

Specific execution may be made reference to step 102.

204: Send the bandwidth information to an endpoint of a service connection through the service connection which passes through the microwave link, so that the endpoint of the service connection adjusts a service policy according to the bandwidth information.

Specific execution may be made reference to step 103.

It can be known from the preceding that, in this embodiment, the network node that is attached by the microwave link may obtain the bandwidth information of the microwave link in the current modulation mode when the current modulation mode of the microwave link is lower than the optimal modulation mode, and sends the bandwidth information to the endpoint of the service connection which passes through the microwave link. Therefore, the endpoint of the service connection may adjust the service policy according to the bandwidth information, so that a bandwidth of the microwave link can meet a service requirement, and service congestion can be avoided.

In the bandwidth information notification method provided in the second embodiment of the present invention, the network node that is attached by the microwave link obtains and sends the bandwidth information when the current modulation mode of the microwave link is detected as being lower than the optimal modulation mode; and if it is detected that the current modulation mode of the microwave link is the optimal modulation mode, bandwidth information may be stopped from being sent to the endpoint of the service connection which passes through the microwave link, so that the endpoint of the service connection uses a normal service policy to perform service processing, and ensures that a microwave link resource is fully utilized.

Figure 3:
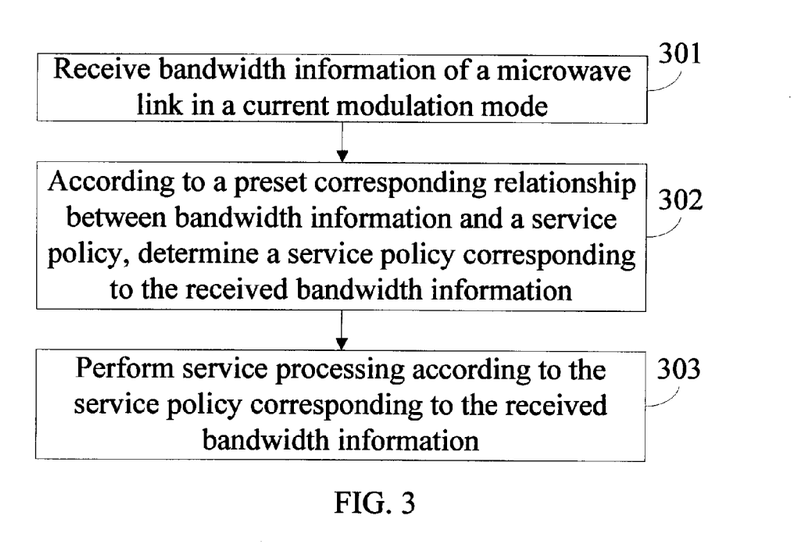
FIG. 3 is a flowchart of a service processing method according to an embodiment of the present invention.

FIG. 3 illustrates a procedure of a service processing method according to an embodiment. In this embodiment, a processing procedure of an endpoint of a service connection which passes through a microwave link is described, which includes:

301: Receive bandwidth information of the microwave link in a current modulation mode, where the bandwidth information is sent by a network node that is attached by the microwave link.

In an embodiment of the present invention, the received bandwidth information may be sent periodically or non-periodically by the network node that is attached by the microwave link when the network node detects that the current modulation mode is lower than an optimal modulation mode.

302. According to a preset corresponding relationship between bandwidth information and a service policy, determine a service policy corresponding to the received bandwidth information.

The corresponding relationship between the bandwidth information and the service policy may be preset, so that the service policy corresponding to the bandwidth information may be determined after the bandwidth information is received. The service policy may specifically be a quality of service (QoS: Quality of Service) policy, or an access control policy, or a service switching policy.

For example, in an embodiment of the present invention, a corresponding relationship may be preset between bandwidth information and a QoS policy, and therefore, after the bandwidth information is received, the QoS policy corresponding to the received bandwidth information may be determined, so that service processing is performed according to the determined QoS policy. Specifically, the endpoint of the service connection may preset a corresponding relationship between bandwidth information and a waterline of a service buffer area. For example, when a bandwidth of the microwave link is larger, a larger service buffer area may be set; and when a bandwidth of the microwave link is smaller, a smaller service buffer area may be set. Therefore, after receiving the bandwidth information, the endpoint of the service connection adjusts the waterline to a position corresponding to a bandwidth that is indicated by the bandwidth information. In this way, a size of the service buffer area is adjusted, and the QoS policy is adjusted.

In another embodiment of the present invention, a corresponding relationship may be preset between bandwidth information and a service switching policy, and therefore, after the bandwidth information is received, the service switching policy corresponding to the received bandwidth information may be determined, so that a service is switched over to a protection path according to the determined service switching policy. The service may be partly or fully switched over to the protection path according to different service switching policies.

If multiple different bandwidth information are received, where the multiple different bandwidth information are corresponding to multiple different bandwidths, bandwidth information corresponding to the smallest bandwidth is selected.

303: Perform service processing according to the service policy corresponding to the received bandwidth information.

Specifically, the service processing may be performed according to the QoS policy corresponding to the bandwidth information, or the access control policy corresponding to the bandwidth information, or the service switching policy corresponding to the bandwidth information.

It can be known from the preceding that, in this embodiment, the endpoint of the service connection which passes through the microwave link receives the bandwidth information of the microwave link in the current modulation mode, where the bandwidth information is sent by the network node that is attached by the microwave link. The service policy is adjusted according to the bandwidth information, so that a bandwidth of the microwave link can meet a service requirement, and service congestion can be avoided.

In another embodiment of the present invention, the network node that is attached by the microwave link obtains and sends the bandwidth information only when the current modulation mode of the microwave link is detected as being lower than the optimal modulation mode; and if the endpoint of the service connection which passes through the microwave link receives no bandwidth information within preset time, it may be considered that the current modulation mode of the microwave link is the optimal modulation mode, so that the service processing is performed by using a normal service policy, thus ensuring that a microwave link resource is fully utilized. The normal service policy may be a normal QoS policy, or a normal access control policy, or a normal service switching policy. When the service policy is a normal service switching policy, the service is switched over from a protection path back to a working path.

Figure 4:
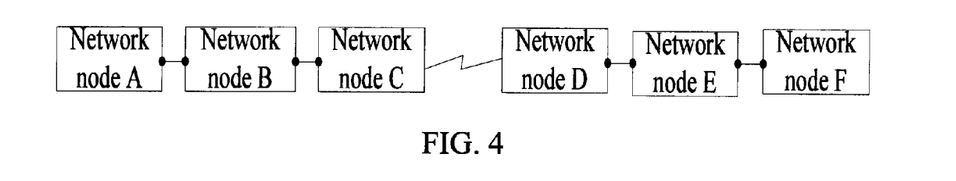
FIG. 4 is a topology diagram of an end-to-end connection in a bandwidth information notification method according to a third embodiment and a fourth embodiment of the present invention.

With specific examples, a bandwidth information notification method in a third embodiment of the present invention is described as follows:

FIG. 4 illustrates a topology of an end-to-end service connection in a bandwidth information notification method according to the third embodiment. As shown in FIG. 4, the service connection passes through a network node A, a network node B, a network node C, a network node D, a network node E, and a network node F. A link between the network node C and the network node D is a microwave link, and the network node A and the network node F are endpoints of the service connection. In some embodiments, the link between the network node C and the network node D is a microwave link, but a principle of the present invention may be applicable to any type of communication links, for example, a satellite link with a variable bandwidth, a passive optical network link, and a digital subscriber line link.

It is assumed that, in a normal situation, the microwave link between the network node C and the network node D adopts a 64QAM modulation mode, and a corresponding bandwidth is 1 Gbps; when the environment changes, for example, when it rains, the modulation mode is lowered to a 16QAM modulation mode, and the bandwidth decreases to 0.6 Gbps.

When detecting that a current modulation mode is lower than an optimal modulation mode 64QAM, the network node C and the network node D send an AIS message through a service connection (may specifically be an LSP), where the AIS message is extended to carry bandwidth information of the microwave link in the current modulation mode. Specifically, the network node C may send the AIS message to the endpoint A or the endpoint F, and definitely, the network node C may also send the AIS message to both the endpoint A and the endpoint F; and the network node D sends the AIS message to the endpoint A or the endpoint F, and definitely, the network node D may also send the AIS message to both the endpoint A and the endpoint F.

Specifically, the AIS message may be extended to carry a link bandwidth type-length-value (link bandwidth TLV: link bandwidth Type-Length-Value) object, and the link bandwidth TLV object carries the bandwidth information of the microwave link in the current modulation mode. Specifically, the bandwidth information may be bandwidth level indication information or modulation mode information.

In this embodiment, the network node that is attached by the microwave link may carry the bandwidth information through the AIS message, and may also carry the bandwidth information through another specific type of message, such as a new OAM message. The AIS message and another specific type of message are uniformly understood as bandwidth notification messages. After receiving the bandwidth information of the microwave link in the current modulation mode, the network node A and the network node F may adjust a service policy according to the bandwidth information.

A specific implementation mode may be: A corresponding relationship is preset between bandwidth information and a QoS policy on the network node A and the network node F. When receiving the bandwidth information of the microwave link in the current modulation mode, the network node A and the network node F enable a QoS policy corresponding to the bandwidth information, and therefore, services are controlled at ingresses (the endpoint A and the endpoint F), so that when the service passes through the microwave link, a congestion situation is avoided.

Another specific implementation mode may be: a corresponding relationship is preset between bandwidth information and a service switching policy on the network node A and the network node F. When receiving the bandwidth information of the microwave link in the current modulation mode, the network node A and the network node F enable a service switching policy corresponding to the bandwidth information, so that a service is partly or fully switched over to a protection path.

When the environment becomes better, and the microwave link is recovered to the optimal modulation mode, the network node C and the network node D stop sending the AIS message.

When no AIS message that carries the bandwidth information is received in preset time, the endpoint A and the endpoint F may use a normal service policy to perform service processing.

It can be known from the preceding that, in this embodiment, the network node that is attached by the microwave link may obtain the bandwidth information of the microwave link in the current modulation mode when the current modulation mode of the microwave link is lower than the optimal modulation mode, and sends the bandwidth information to the endpoint of the service connection which passes through the microwave link. Therefore, the endpoint of the service connection may adjust the service policy according to the bandwidth information, so that a bandwidth of the microwave link can meet a service requirement, and service congestion can be avoided.

A bandwidth information notification method provided in a fourth embodiment of the present invention is described by still taking the scenario described in FIG. 4 as an example. As shown in FIG. 4, an end-to-end service connection passes through a network node A, a network node B, a network node C, a network node D, a network node E, and a network node F. A link between the network node C and the network node D is a microwave link, and the network node A and the network node F are endpoints of the service connection.

It is assumed that, in a normal situation, the microwave link between the network node C and the network node D adopts a 64QAM modulation mode, and a corresponding bandwidth is 1 Gbps; when the environment changes, for example, when it rains, the modulation mode is lowered to a 16QAM modulation mode, and the bandwidth decreases to 0.6 Gbps.

The network node C and the network node D detect a current modulation mode in real time, and send a new OAM message periodically through a service connection (may specifically be an LSP) in a normal period. The new OAM message carries bandwidth information of the microwave link in the current modulation mode. Specifically, the network node C may send a new OAM message to the endpoint A or the endpoint F, and definitely, the network node C may also send the new OAM message to both the endpoint A and the endpoint F; and the network node D sends a new OAM message to the endpoint A or the endpoint F, and definitely, the network node D may also send the new OAM message to both the endpoint A and the endpoint F. When it is detected that the modulation mode changes, several OAM messages are sent with a higher frequency, so as to notify the change of the bandwidth in time. Subsequently, the OAM messages are sent in a normal period. For example, a normal period of sending a new OAM message is 1 second; and when the bandwidth changes, the first three frames of the new OAM message are sent in a period of 10 milliseconds, and subsequently, a period of sending a new OAM message is restored to 1 second.

Specifically, the new OAM message and the AIS message are uniformly understood as bandwidth notification messages. The new OAM message may carry a link bandwidth TLV object, and the link bandwidth TLV object carries bandwidth information. Specifically, the bandwidth information may be bandwidth level indication information or modulation mode information.

A specific implementation mode may be: a corresponding relationship is preset between bandwidth information and a QoS policy on the network node A and the network node F. When receiving the bandwidth information of the microwave link in the current modulation mode, the network node A and the network node F enable a QoS policy corresponding to the bandwidth information, and therefore, services are controlled at ingresses (the endpoint A and the endpoint F), so that when the service passes through the microwave link, a congestion situation is avoided.

Another specific implementation mode may be: a corresponding relationship is preset between bandwidth information and a service switching policy on the network node A and the network node F. When receiving the bandwidth information of the microwave link in the current modulation mode, the network node A and the network node F enable a service switching policy corresponding to the bandwidth information, so that a service is partly or fully switched over to a protection path.

It can be known from the preceding that, in this embodiment, the network node that is attached by the microwave link may obtain the bandwidth information of the microwave link in the current modulation mode when the current modulation mode of the microwave link is lower than the optimal modulation mode, and sends the bandwidth information to the endpoint of the service connection which passes through the microwave link. Therefore, the endpoint of the service connection may adjust the service policy according to the bandwidth information, so that a bandwidth of the microwave link can meet a service requirement, and service congestion can be avoided.

Figure 5:
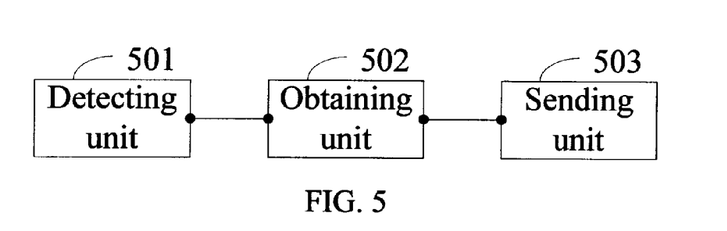
FIG. 5 is a structural diagram of a network node according to a first embodiment of the present invention.

The following describes a network node provided in an embodiment of the present invention. FIG. 5 illustrates a structure of a network node according to a first embodiment. The network node includes:

a detecting unit 501, configured to detect a current modulation mode of a microwave link;

an obtaining unit 502, configured to obtain bandwidth information of the microwave link in the current modulation mode that is detected by the detecting unit 501; and a sending unit 503, configured to send the bandwidth information obtained by the obtaining unit 502 to an endpoint of a service connection through the service connection which passes through the microwave link, so that the endpoint of the service connection adjusts a service policy according to the bandwidth information.

It can be known from the preceding that, in this embodiment, the network node may obtain the bandwidth information of the microwave link in the current modulation mode, and sends the bandwidth information to the endpoint of the service connection which passes through the microwave link. Therefore, the endpoint of the service connection may adjust the service policy according to the bandwidth information, so that a bandwidth of the microwave link can meet a service requirement, and service congestion can be avoided.

Figure 6:
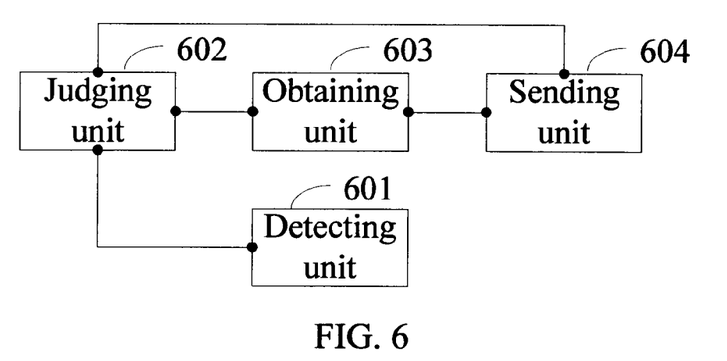
FIG. 6 is a structural diagram of a network node according to a second embodiment of the present invention.

FIG. 6 illustrates a structure of a network node according to a second embodiment. The network node includes:

a detecting unit 601, configured to detect a current modulation mode of a microwave link;

a judging unit 602, configured to judge whether the current modulation mode that is detected by the detecting unit 601 is lower than an optimal modulation mode;

an obtaining unit 603, configured to, when the judging unit 602 judges that the current modulation mode that is detected by the detecting unit is lower than the optimal modulation mode, obtain bandwidth information of the microwave link in the current modulation mode that is detected by the detecting unit; and a sending unit 604, configured to send the bandwidth information obtained by the obtaining unit 603 to an endpoint of a service connection through the service connection which passes through the microwave link, so that the endpoint of the service connection adjusts a service policy according to the bandwidth information.

In an embodiment of the present invention, when the judging unit 602 judges that the current modulation mode is the optimal modulation mode, the sending unit 604 stops sending the bandwidth information to the endpoint of the service connection which passes through the microwave link, so that the endpoint of the service connection uses a normal service policy to perform service processing.

It can be known from the preceding that, in this embodiment, the network node may obtain the bandwidth information of the microwave link in the current modulation mode when the current modulation mode of the microwave link is lower than the optimal modulation mode, and sends the bandwidth information to the endpoint of the service connection which passes through the microwave link. Therefore, the endpoint of the service connection may adjust the service policy according to the bandwidth information, so that a bandwidth of the microwave link can meet a service requirement, and service congestion can be avoided.

Figure 7:
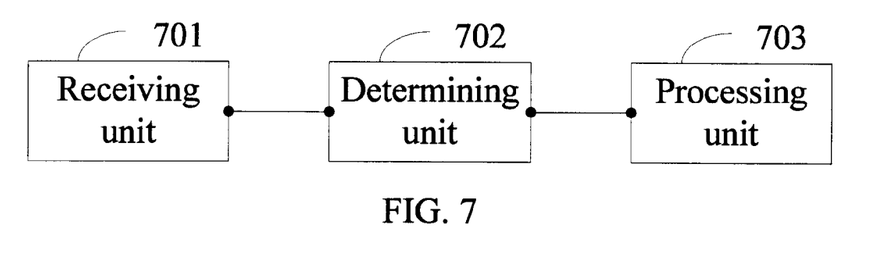
FIG. 7 is a structural diagram of a network node according to a third embodiment of the present invention.

FIG. 7 illustrates a structure of a network node according to a third embodiment. The network node may include:

a receiving unit 701 configured to receive bandwidth information of a microwave link in a current modulation mode, where the bandwidth information is sent by a network node that is attached by the microwave link, and a determining unit 702 configured to, according to a preset corresponding relationship between bandwidth information and a service policy, determine a service policy corresponding to the bandwidth information that is received by the receiving unit 701.

In an embodiment of the present invention, the determining unit 702 is further configured to determine the service policy as a normal service policy when the receiving unit 701 does not receive the bandwidth information in preset time.

A processing unit 703 is configured to perform service processing according to the service policy that is determined by the determining unit 702.

It can be known from the preceding that, in this embodiment, the network node may receive the bandwidth information of the microwave link in the current modulation mode, where the bandwidth information is sent by the network node that is attached by the microwave link, and the service policy is adjusted according to the bandwidth information, so that a bandwidth of the microwave link can meet a service requirement, and service congestion can be avoided.

An embodiment of the present invention further provides a communication system. The communication system includes a network node provided in an embodiment of the present invention.

An information exchange between each module in the preceding apparatus and system and an implementation process in the apparatus and system are based on the same conception with the method embodiment of the present invention, and therefore, the specific content may be made reference to the description of the method embodiment of the present invention, which is not further described here.

Persons of ordinary skill in the art may understand that all or part of the procedures of the method in the preceding embodiments may be implemented by a program instructing relevant hardware including a processor. The program may be stored in a computer readable storage medium. When the program runs, the procedures of the method in the preceding embodiments. The storage medium may be a magnetic disk, a read-only memory (Read-Only Memory, ROM), or a random access memory (Random Access Memory, RAM).

The bandwidth information notification method, the network node, and the communication system that are provided in the embodiments of the present invention are described in detail in the preceding. The description of the preceding embodiments is only used for helping to understand the method and idea of the present invention; meanwhile, those skilled in the art may make variations to the specific implementation and the application scope according to the idea of the present invention. In conclusion, the content of this specification shall not be construed as a limitation to the present invention.

What is claimed is:

1. A bandwidth information notification method, comprising:
   obtaining, by a network node, bandwidth information of a microwave link; and
   sending, by a network node, a plurality of OAM messages carrying the bandwidth information to an endpoint of a service connection, the plurality of OAM messages being sent through the service connection which passes through the microwave link, wherein first one or more OAM messages or the plurality of OAM messages are sent with a higher frequency than at least one of the rest of the plurality of OAM messages, and wherein the endpoint of the service connection adjust a service policy according to the bandwidth information.

2. The bandwidth information notification method according to claim 1, wherein obtaining the bandwidth information of the microwave link comprises:
   detecting a modulation mode of the microwave link; and
   obtaining bandwidth information of the microwave link in the modulation mode.

3. The bandwidth information notification method according to claim 2, wherein, before obtaining the bandwidth information of the microwave link in the modulation mode, the method further comprises:
   determining whether the modulation mode is lower than an optimal modulation mode; and
   obtaining the bandwidth information of the microwave link in the modulation mode when the modulation mode is lower than the optimal modulation mode.

4. The bandwidth information notification method according to claim 3, further comprising stopping sending the bandwidth information to the endpoint of a service connection when it is detected that the modulation mode of the microwave link is the optimal modulation mode.

5. The bandwidth information notification method according to claim 1, further comprising: stop sending the plurality of OAM messages carrying the bandwidth information to the endpoint when the bandwidth is within a threshold.

6. A network node, comprising:
   an obtaining unit, configured to obtain bandwidth information of a microwave link; and
   a sending unit, configured to send a plurality of OAM messages carrying the bandwidth information obtained by the obtaining unit to an endpoint of a service connection, the plurality of OAM messages being sent through the service connection which passes through the microwave link, wherein first one or more OAM messages of the plurality of OAM messages are sent with a higher frequency than at least one of the rest of the plurality of OAM messages, and wherein the endpoint of the service connection is configured to adjust a service policy according to the bandwidth information.

7. The network node according to claim 6, wherein the network node further comprises:
   a detecting unit, configured to detect a modulation mode of the microwave link, wherein the obtaining unit is configured to obtain bandwidth information of the microwave link in the modulation mode that is detected by the detecting unit.

8. The network node according to claim 7, further comprising:
   a judging unit, configured to determine whether the modulation mode that is detected by the detecting unit is lower than an optimal modulation mode, wherein the obtaining unit is configured to, when the judging unit determines that the modulation mode that is detected by the detecting unit is lower than the optimal modulation mode, obtain the bandwidth information of the microwave link in the modulation mode that is detected by the detecting unit.

9. The network node according to claim 8, wherein:
   the sending unit is further configured to, when the judging unit determines that the modulation mode of the microwave link is the optimal modulation mode, stop sending the bandwidth information to the endpoint of the service connection.

10. The network node according to claim 6, wherein the sending unit is further configured to stop sending the plurality of OAM messages carrying the bandwidth information to the endpoint when the bandwidth is within a threshold.

11. A communication system, comprising:
    at least two network nodes, wherein a first network node of the at least two network nodes is configured to obtain bandwidth information of a microwave link, and to send a plurality of OAM messages carrying the bandwidth information to an endpoint of a service connection, the plurality of OAM messages being sent through the service connection which passes through the microwave link, wherein first OAM messages of the plurality of OAM messages are sent with a higher frequency than at least one of the rest of the plurality of OAM messages, and
    wherein the endpoint of the service connection is configured to adjust a service policy according to the bandwidth information.

12. The communication system according to claim 11, wherein the first network node is further configured to stop sending the plurality of OAM messages carrying the bandwidth information to the endpoint when the bandwidth is within a threshold.

* * * * *

UNITED STATES PATENT AND TRADEMARK OFFICE
CERTIFICATE OF CORRECTION

PATENT NO.       : 9,100,327 B2
APPLICATION NO.  : 13/371795
DATED            : August 4, 2015
INVENTOR(S)      : Long Page 1 of 1

It is certified that error appears in the above-identified patent and that said Letters Patent is hereby corrected as shown below:

In the claims

Col. 11, line 14, claim 1, delete "OAM messages or the plurality" and insert --OAM messages of the plurality--.

Signed and Sealed this
Eighth Day of December, 2015

Michelle K. Lee
*Director of the United States Patent and Trademark Office*